(12) United States Patent
Lindner et al.

(10) Patent No.: US 10,946,469 B2
(45) Date of Patent: Mar. 16, 2021

(54) METHOD FOR WELDING METAL-BASED MATERIALS

(71) Applicant: Outokumpu Oyj, Helsinki (FI)

(72) Inventors: Stefan Lindner, Willich (DE); Jasminko Skrlec, Duisburg (DE)

(73) Assignee: Outokumpu Oyj, Helsinki (FI)

( * ) Notice: Subject to any disclaimer, the term of this patent is extended or adjusted under 35 U.S.C. 154(b) by 650 days.

(21) Appl. No.: 15/557,266

(22) PCT Filed: Mar. 11, 2016

(86) PCT No.: PCT/EP2016/055259
§ 371 (c)(1),
(2) Date: Sep. 11, 2017

(87) PCT Pub. No.: WO2016/146511
PCT Pub. Date: Sep. 22, 2016

(65) Prior Publication Data
US 2018/0056432 A1 Mar. 1, 2018

(30) Foreign Application Priority Data
Mar. 13, 2015 (EP) .................................... 15158962

(51) Int. Cl.
*B23K 11/11* (2006.01)
*B23K 9/173* (2006.01)
(Continued)

(52) U.S. Cl.
CPC ............ *B23K 11/115* (2013.01); *B23K 9/173* (2013.01); *B23K 10/02* (2013.01); *B23K 11/061* (2013.01);
(Continued)

(58) Field of Classification Search
CPC ...... B23K 10/02; B23K 11/061; B23K 11/115; B23K 11/14; B23K 11/20; B23K 15/0046; B23K 26/22; B23K 28/02; B23K 9/173
See application file for complete search history.

(56) References Cited

U.S. PATENT DOCUMENTS

| 4,959,518 A | 9/1990 | Reynolds, Jr. |
| 5,622,573 A | 4/1997 | Ikeda et al. |

(Continued)

FOREIGN PATENT DOCUMENTS

| DE | 2541963 A1 | 4/1976 |
| EP | 1582283 A1 | 10/2005 |

(Continued)

OTHER PUBLICATIONS

Robert W. Messler, "Weld-bonding: the best or worst of two processes?", Industrial Robot, vol. 29 No. 2, pp. 138-148. https://doi.org/10.1108/01439910210419150 (Year: 2002).*

(Continued)

*Primary Examiner* — Dana Ross
*Assistant Examiner* — James F Sims, III
(74) *Attorney, Agent, or Firm* — The Webb Law Firm

(57) ABSTRACT

The invention relates to a method of welding of at least two metal-based materials (5, 7), non-weldable directly to each other with resistance welding. At least one spacer (6) is joined by welding on at least one of the two surfaces of a material (5) in every interstice between two surfaces of materials to be welded. The welded spacer (6) is utilized so that resistance welding is focused to the surface of the material (5) with the spacer (6) to melt at least one spacer (6) located on the heat affecting zone in order to achieve a weld between the metal-based materials (5, 7).

22 Claims, 5 Drawing Sheets

Figure 3A:
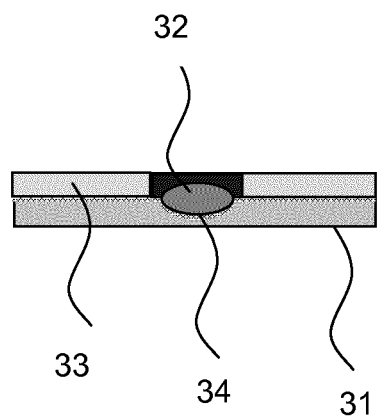

(51) Int. Cl.
  *B23K 10/02*  (2006.01)
  *B23K 11/06*  (2006.01)
  *B23K 11/14*  (2006.01)
  *B23K 11/20*  (2006.01)
  *B23K 15/00*  (2006.01)
  *B23K 28/02*  (2014.01)
  *B23K 26/22*  (2006.01)

(52) U.S. Cl.
  CPC .............. *B23K 11/14* (2013.01); *B23K 11/20* (2013.01); *B23K 15/0046* (2013.01); *B23K 26/22* (2013.01); *B23K 28/02* (2013.01)

(56) References Cited

U.S. PATENT DOCUMENTS 6,642,471 B2 * 11/2003 Imai .................. B23K 11/14
                                                219/117.1
9,597,988 B2    3/2017 Sakkinen et al.

2005/0152741 A1 *  7/2005 Fujimoto ............. B23K 9/0026
                                                403/270
2008/0289503 A1 * 11/2008 Bruck .................. B23K 11/008
                                                95/273
2009/0014419 A1 *  1/2009 Vittone ................. B21F 27/10
                                                219/58
2012/0298637 A1 * 11/2012 Sakkinen ............... B23K 26/22
                                                219/121.64

FOREIGN PATENT DOCUMENTS

JP     59229293 A    12/1984
WO   2011060432 A1    5/2011

OTHER PUBLICATIONS

English translation, EP1582283, Staeves et al. (Year: 2005).*

* cited by examiner

FIG. 1
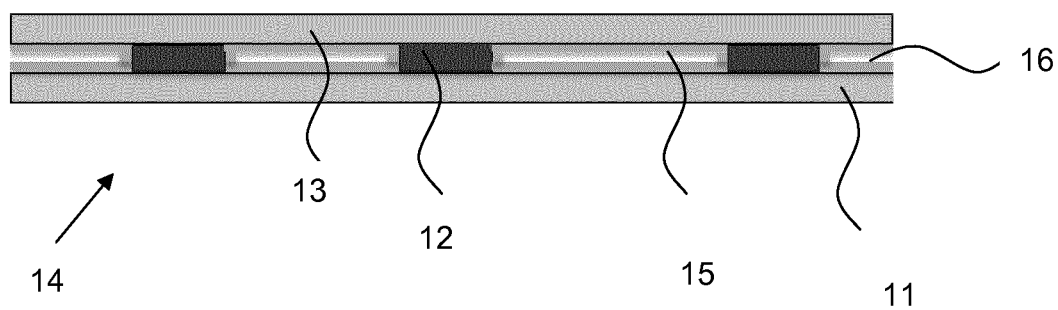
FIG. 2
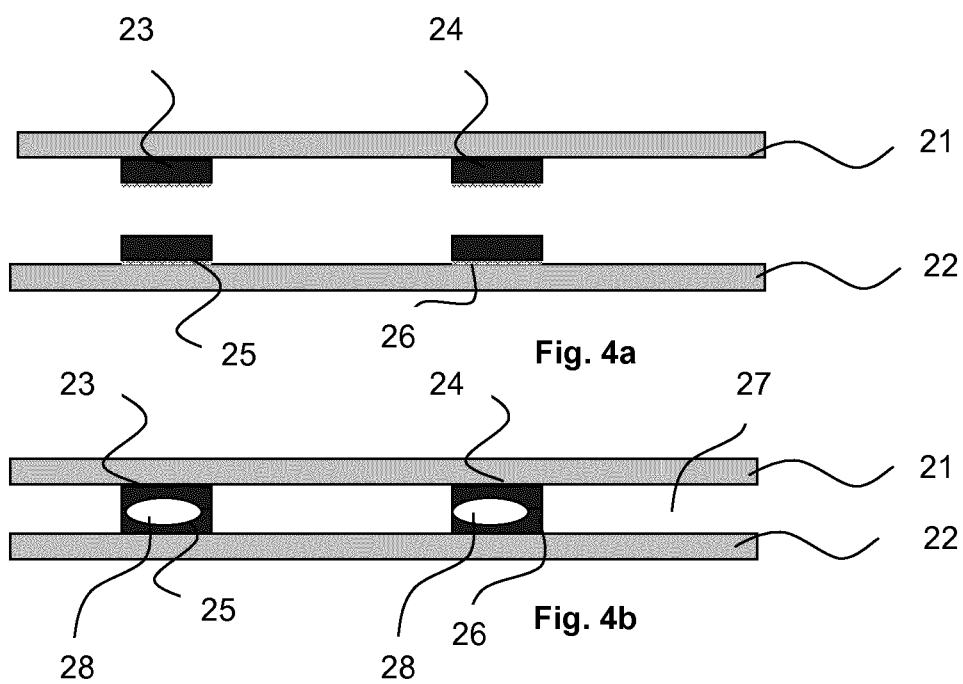
Fig. 4a
Fig. 4b

METHOD FOR WELDING METAL-BASED MATERIALS

CROSS-REFERENCE TO RELATED APPLICATIONS

This application is the United States national phase of International Application No. PCT/EP2016/055259 filed Mar. 11, 2016, and claims priority to European Patent Application No. 15158962.9 filed Mar. 13, 2015, the disclosures of which are hereby incorporated in their entirety by reference.

The present invention relates to a method for welding metal-based materials by using a welded spacer, which makes possible to use resistance welding in connection with joining of materials otherwise non-weldable to each other by resistance welding.

The resistance welding is one of the most used welding procedures in metal manufacturing industries. The resistance welding can be carried out for instance by spot welding, roller seam welding or weldbonding welding in order to have welded white goods, fuel tanks, body construction of cars, railways or trucks. But there are a lot of materials, such as hot formed martensitic stainless steel or two and three material combinations which do not have weldability for a resistance welding process. For those materials there are several ideas to create mechanical solder or brazing depots on the material. However, those mechanical solder or brazing depots require deformation and/or cutting of the material in order to have good bond between the material and the mechanical solder or brazing depots. When the materials are further treated by the traditional resistance welding processes the weld spot has typically as results cold cracks brittle fracture behaviour and therefore and therefore low strength level.

The mechanical solder or brazing depots before the welding process are difficult to use especially in the course of multi-material-design. Further, mechanical solder or brazing depots will cause an increase in manufacturing costs.

The EP patent application 1582283 relates to a process for spot welding of two rigid steel sheet parts where small platelets, preferably of easily welded metal such as low-carbon iron, are arranged between the sheets at the welding points. Before spot welding the material to be welded is normally transferred from one position to another. Using platelets not fixed with the material to be welded there is a great danger that the platelets will move from their desired position during transferring. The EP patent application 1582283 has not indicated anything about this kind of a danger.

The DE patent application 2541963 describes a process for joining two or more shaped metal parts, using a sealant between all the joint surfaces, the sealant contains individual round grins of metal, or another material, with a controlled grain-size, and the two metal parts being joined are brought together leaving a gap determined by the preselected grain-size; the parts are then joined by, or via the sealant. Thus in the DE patent application 2541963 two metal parts are welded together with traditional spot welding, not considering the fact that the metal parts are not able to be welded by spot welding.

The JP patent application S59229293 relates to a method for joining securely different metallic plates while forming a clearance between both metallic plates by interposing an insert piece by solid-phase joining of respective metals between the different metallic plates which permit fusion joining. The method of the JP patent application S59229293 uses rotating tools for friction welding. This kind of process is suitable for materials, such as titanium and aluminium which are able for plastification, not suitable for stainless steels or more generally for steels.

For welding of especially stainless steels it is generally used the Schaeffler diagram which defines the microstructure areas in the steels by means of the chromium equivalent ($Cr_{eq}$) and the nickel equivalent ($Ni_{eq}$). In the diagram the $Cr_{eq}$ and $Ni_{eq}$ are calculated according to the following formulas $$Cr_{eq}=\% \ Cr+\% \ Mo+1.5\times\% \ Si+0.5\times\% \ Nb+0.5\times\% \ Ti \quad (1)$$

$$Ni_{eq}=\% \ Ni+30\times(\% \ C+\% \ N)+0.5\times\% \ Mn \quad (2).$$

The Schaeffler diagram provides information on the welding properties of the various types of microstructure, thus as a function of what alloying elements they contain. The Schaeffler diagram is also classified with welding problems, having different areas for hot cracking, cold crack, grain growth and embrittlement.

The U.S. Pat. No. 4,959,518 describes welding of studs in accordance with the Schaeffler diagram. Also the U.S. Pat. No. 5,622,573 uses the Schaeffler diagram in welding for a material having been overlaid onto a cast iron base metal. The WO publication 2011/060432 describes the use of the Schaeffler diagram for dissimilar joints between a TWIP steel and a carbon steel with laser beam welding. However, these publications do not describe anything about resistance welding.

Figure 7:
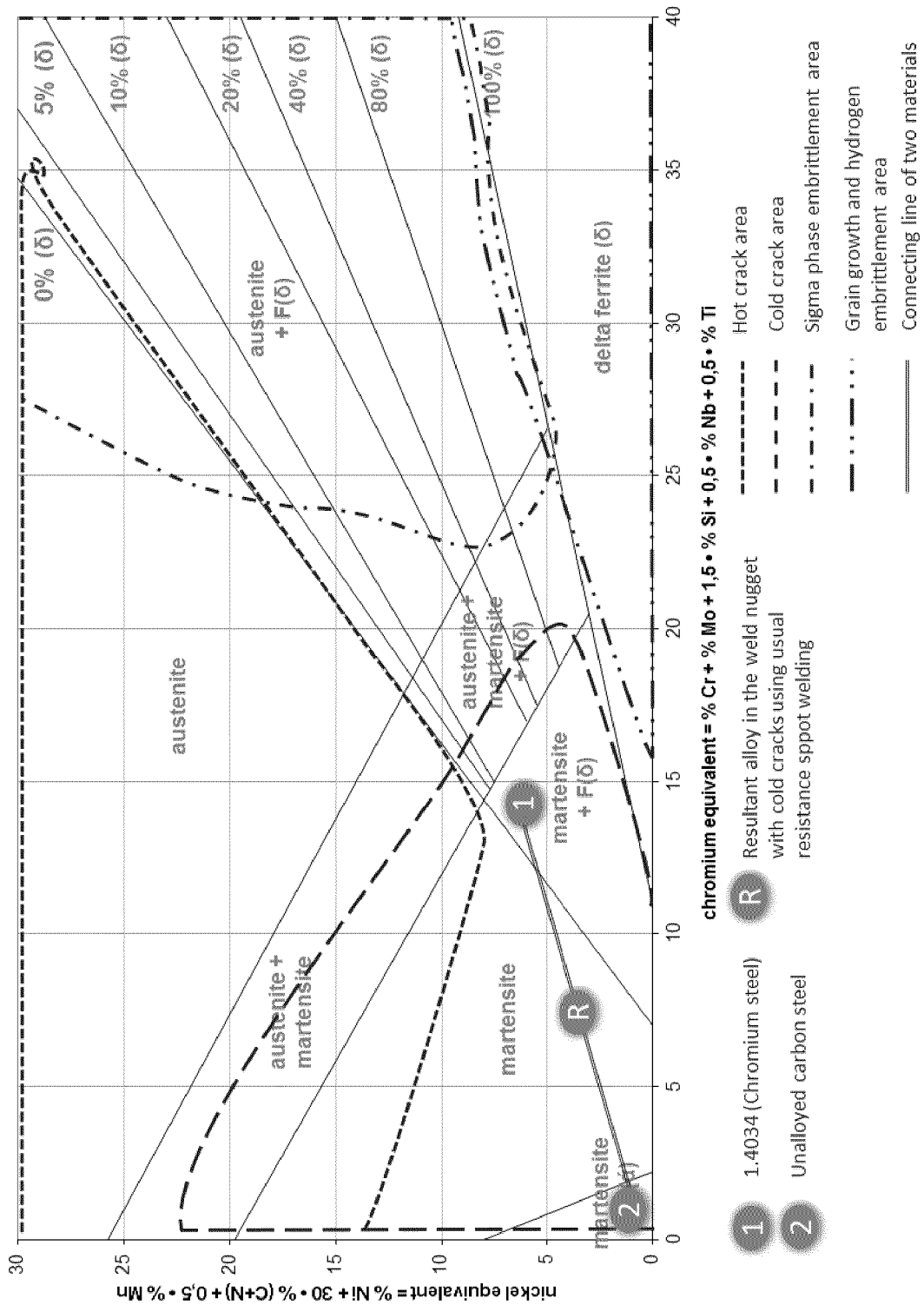

In the FIG. 7 hereafter the Schaeffler diagram is illustrated with hot cracking area, cold crack area, grain growth area and embrittlement area. The FIG. 7 is also provided with an example of welding problems. In this example a resistance spot welding between a martensitic stainless steel 1.4304 (steel 1) and an unalloyed carbon steel (steel 2) is not possible because the resultant alloy (R) created in the resistance welding is still in the cold cracking area and thus the weld nugget between those steels is with cold cracks and thus not valuable for the use.

The object of the present invention is to eliminate some drawbacks of the prior art and to achieve a welding method containing resistance welding as at least one process step with metal-based materials, which are non-weldable with the resistance welding. A connection between metal-based materials, non-weldable directly to each other by the resistance welding, is established with a spacer, which is joined by welding to the material before the resistance welding. The essential features of the present patent application are enlisted in the appended claims.

According to the present invention, a method for welding of at least two metal-based materials, non-weldable directly to each other with resistance welding, contains at least one joining process step by welding before a resistance welding step. In the case with only two metal-based materials, wherein both the materials are non-weldable to each other by resistance welding, the first step is to join a spacer preferably to one of those materials, described as the first material to be welded. It is also possible to join a spacer to both materials. In the second step of the method according to present invention the spacer is utilized so that the resistance welding is focused on the surface of the spacer in the first material to be welded and to the surface of the other material to be welded. Thus a welding joint is achieved between two materials directly non-weldable to each other with resistance welding. In the case with two metal-based materials, wherein one of the materials is non-weldable by resistance welding, the spacer is welded on the surface of the non-weldable material by resistance welding. In the case, there are more than two metal-based materials, non-weldable directly to each other by resistance welding, in utilizing the method of the present invention at least one spacer is joined by welding on the surfaces of the materials in every interstice between two surfaces of materials to be welded on at least one of the two surfaces, directly non-weldable to each other with resistance welding.

The spacer according to the present invention is advantageously created of a filler material or a braze material. The material of the spacer is dependent on the material on which surface the spacer is joined in order to have a good contact and high strength between the spacer and the joined metal-based material. When using a brazing material as the spacer, the microstructure of the material to be welded will not be destroyed during the method of the present invention. Additionally, a good plug fracture in the spacer is required for successful processing with the resistance welding.

The shape of the spacer in accordance with the present invention can be essentially sheet-like. However, it is advantageous to use the essentially sheet-like material as a substrate so that the essentially sheet-like material is provided with protrusions. The protrusions are positioned essentially regularly so that the protrusions are spaced a defined distance apart from each other. The construction of the spacer gives a proportion of diameter to height for the spacer at least five. Further, the height of a spacer is advantageously at least 0.5 millimeter in order to achieve a desired gap between the materials welded in accordance with the present invention.

After the joining the spacer on the desired surface of a material, the resistance welding is advantageously focused on the surface of the spacer in the first material and on the surface of the other material in order to achieve a weld between the first material and the other material for producing a desired construction, containing materials, otherwise non-weldable directly to each other with resistance welding. However, for the resistance welding it is also possible to utilize a bypass effect, in which case the heating during resistance welding causes a physical effect on the heat affecting zone on the surface to be welded. This effect causes spacers located on the heat affecting zone to be melted. Therefore, it is possible to focus the resistance welding on the area between spacers located on the heat affecting zone. The bypass effect causes adjacent spacers to be melted, and thus a successful resistance welding is carried out. The same effects are also considered when spacers are joined to both materials so that the surfaces of the spacers which are opposite to the surfaces of the spacers joined to the materials to be welded have contact with each other before resistance welding.

It is also possible to utilize the method of the invention so that a spacer is joined to one material and then the material with the spacer is resistance welded with two or more materials, weldable directly to each other with resistance welding. In this case the two or more materials, weldable directly to each other with resistance welding, are positioned in the opposite side to the surfaces of the materials non-weldable directly to each other with resistance welding, between which surfaces the spacer is positioned. The resistance welding is thus focussed to the first material having the spacer, to the spacer itself and to at least one intermediate material which is directly resistance welded with one other material. Using a spacer in this kind of combination it makes possible to control and to have a desired direction for the welding heat. In one embodiment applying the control of welding heat a spacer with a low thermal conductivity is welded to a thin sheet or to a material with a high thermal conductivity. Then the intermediate material is a thicker sheet or has a lower thermal conductivity than the first material with the spacer. One another advantage based on the use of a spacer is that the spacer can avoid liquid metal embrittlement of resistance spot welds between austenitic steels and a zinc coating of the other sheet. The spacer can be made with a ferritic filler metal and shows no liquid metal embrittlement, and because of the distance/gap between the two sheets, liquid metal embrittlement is avoid in the austenitic sheet. In this case the spacer must be welded at first to the zinc coated sheet.

The joining of the spacer, as the first process step in the method of the present invention, is carried out advantageously by welding using arc welding or beam welding. The process step using arc welding can be carried out by for instance plasma welding, gas metal arc welding, such as TIG (Tungsten Inert Gas) welding or MIG (Metal Inert Gas) welding. The process step using beam welding can be carried out by laser beam welding or electron beam welding. Naturally, other welding methods except resistance welding can be used in the joining of the spacer according to the present invention.

The resistance welding process step in accordance with the present invention can be carried out by different kinds of the resistance welding, such as spot welding, roller seam welding, projection welding or weldbonding. Weldbonding is a combination of the conventional resistance spot welding and adhesive bonding. When in the resistance welding bonding is the result of heat and pressure, the adhesive join consists of an adhesive film strip applied between the both surfaces to be joined. With regard to the projection welding, which is a modification of the resistance welding, the weld is localized by means of raised projections on one or on both of the workpieces to be welded.

According to the present invention there is no contact corrosion between the dissimilar joining materials. The spacer reduces the contact corrosion between two materials to be welded. According to the prior art the materials are directly in contact with each other. With the construction of the spacer there is a defined gap between the two materials and the joint place. The spacer can be specifically alloyed to avoid the corrosion problem and makers possible to use also materials having different electrochemical potentials.

Using the method of the present invention with the described construction of the spacer achieves a desired gap between the welded materials and a better wetting of cathodic dip coating in crevice conditions and, thus no crevice corrosion or cranny corrosion exists Instead of cathodic dip coating, other coating methods or painting methods can be used, such as ground coating, priming coating, undercoating, structure coating and welding primer coating.

One another possible solution of the present invention is for tubes where: an inner tube is welded with spacer at the outer side and then a second tube is imposed, having contact to the spacer and, further, the combination is resistance welded to each other. As a result the tubes have a defined gap to each other because of the spacer. The spacer can also be used to separate the tubes in point of electrochemical corrosion potential. The gap achieved by the spacer can also be utilized for cooling or heating with air or a fluid medium.

The method of the present invention can be utilized for instance in the automotive industry and for busses, trucks and railway vehicles, because of the good behaviour in combination with a hybrid joining process, such as weldbonding. In weldbonding, when using a spacer according to the present invention it is prevented to create a steam channel in an adhesive, because the spacer replaces the adhesive material at the area of the following resistance welding area. Therefore, there is essentially no way for corrosive substance to reach the welding area.

Figure 3B:
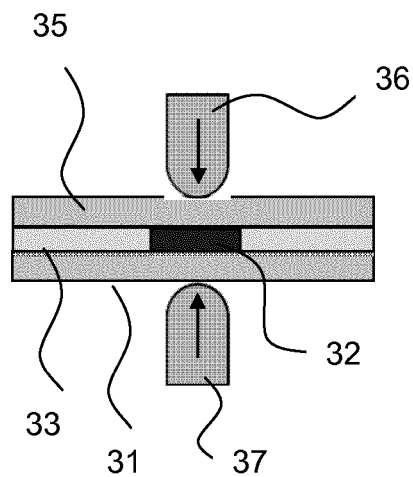
Figure 3C:
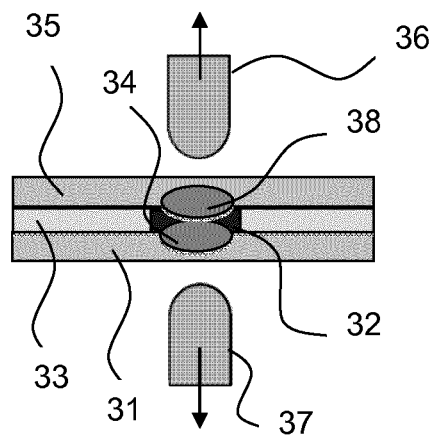
Figure 5:
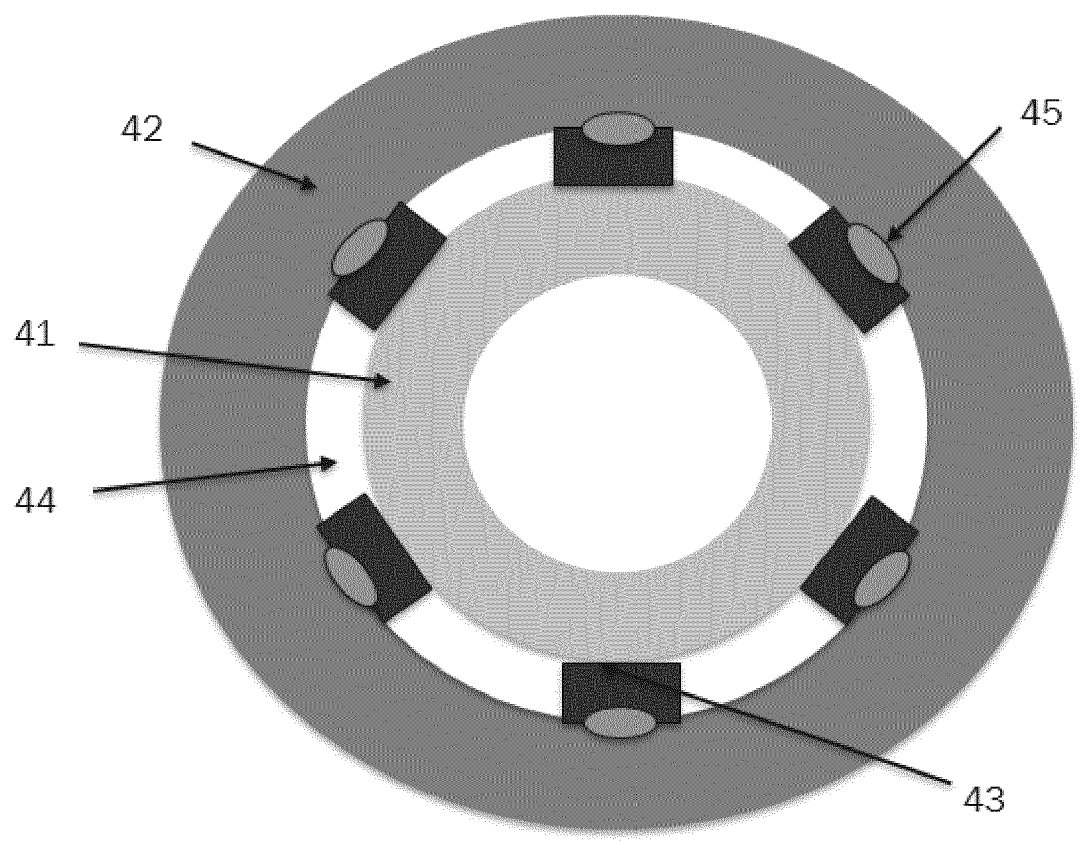
Figure 6:
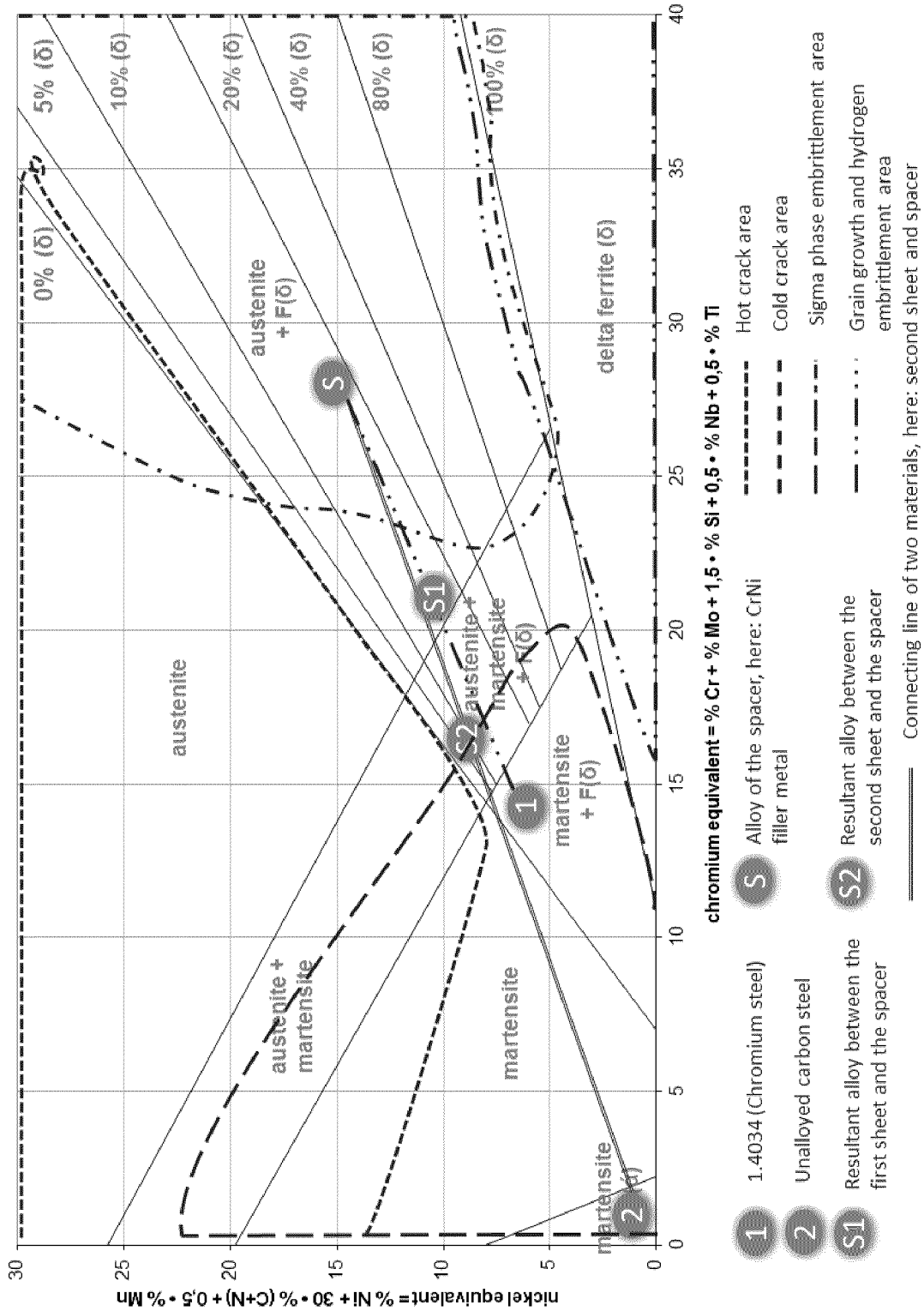

The invention is described in more details in the following referring to the drawings, wherein FIG. 1 illustrates one preferred embodiment of the invention schematically from the side view, FIG. 2 illustrates another preferred embodiment of the invention schematically from the side view, FIGS. 3a, 3b and 3c illustrates a preferred embodiment of the invention schematically from the side view, FIGS. 4a and 4b illustrates a preferred embodiment of the invention schematically from the side view, FIG. 5 illustrates still one preferred embodiment of the invention schematically in cross-section, FIG. 6 shows an example to use the Schaeffler diagram in accordance with the invention, and FIG. 7 illustrates, as described in the prior art of the invention, Schaeffler diagram with an example of problems in the prior art.

The materials, non-weldable directly together with the resistance welding, to be used in the method of the present invention can be for instance steels which are out of the Schaeffler diagram. In general, the steels containing more than 0.25 weight % C, more than 3 weight % Mn, more than 0.1 weight % N and more than 3 weight % Mo are out of the Schaeffler diagram. Furthermore it is possible with the invention to avoid areas of the Schaeffler diagram which are classified with welding problems as illustrated in FIG. 7. The manner to avoid these problems is to use the spacer in a kind of an alloying element. By using the spacer on that manner it is possible to calculate and to choose the material for the spacer with the Schaeffler diagram.

Further, the materials also used in the method of the present invention are the steels having the carbon equivalent (CEV) more than 0.65%, where CEV is calculated using a formula (element contents by weight %):

CEV=C+Mn/6+(Cu+Ni)/15+(Cr+Mo+V)/5.

Also other metal materials, such as aluminium, can be treated in accordance with the present invention.

In FIG. 1 the first welded material 5 provided with a spacer 6 has been welded by resistance welding to the second material 7. The spacer 6 has achieved a gap 8 between the welded materials 5 and 7. The gap 8 prevents a direct contact between the welded materials 5 and 7. Based on the gap 8 defined by the spacer 6 the welded materials 5 and 7 can have different electrochemical potentials without any contact corrosion.

FIG. 2 illustrates cathodic dip coating in connection with the present invention. The first welded material 11 provided with a spacer 12 has been welded by resistance welding to the second material 13. The welded structure 14 is further treated in a coating process to have a coating layer 15, thanks to the spacer 12, on the surface of the first material 11, on the surface of the spacer 12 and on the surface of the second material 13, because the spacer 12 achieves a gap 16 between the welded materials 11 and 13.

The present invention is applied for weldbonding in accordance with FIGS. 3a, 3b and 3c. In FIG. 3a the first material 31 to be welded is provided with a spacer 32 and with an adhesive material 33 for weldbonding. The FIG. 3a also shows the welding area 34 between the first material to be welded and the spacer 32. In FIG. 3b the second material 35 to be welded is added on the adhesive material 33, and the welding electrodes 36 and 37 are ready to start welding between the materials 31 and 35. FIG. 3c illustrates the result of the weldbonding, a nugget weld 38, between the spacer and the second welded material 35. Because the adhesive material 33 was not splashed out, there is no stream channel between the materials 31 and 35.

FIG. 4a illustrates an embodiment where spacers 23 and 24 are welded to the first material 21, and spacers 25 and 26 are welded to the second material 22. As illustrated in FIG. 4b the material 21 and 22 are spot welded in order to have a weld nugget 28 using the spacers 23 and 24 and respectively 25 and 26. Based on the spacers 23 and 25 and respectively 24 and 26 on the both materials 21 and 22 the gap 27 is thus larger than in the embodiment of FIG. 1 that makes better to avoid contact corrosion between the materials 21 and 22.

FIG. 5 illustrates the present invention applied for a tube after resistance welding. The inner tube 41 is first provided with a spacer 43 and then the outer tube 42 is imposed around the inner tube 41. The inner tube 41 and the outer tube 42 are resistance welded to each other to achieve the weld nugget 45. Thus a gap 44 caused by the spacer 43 is formed between the inner tube 41 and the outer tube 42.

FIG. 6 illustrates an example for the use of the Schaeffler diagram according to the invention. In the example the same steels as in the prior art FIG. 7, a martensitic stainless steel 1.4034 being as the first metal 1 and an unalloyed carbon steel being as a second metal 2 shall be welded together. For the spacer material S it is selected a CrNi filler metal which microstructure consists of austenite and about 20 vol % ferrite. The spacer material S is welded with the metal 1 by arc welding, and a resultant alloy S1 is achieved between the first metal 1 and the spacer S. When the second metal 2 is then welded by the resistance welding with the spacer S, the final resultant alloy S2 between the second metal 2 and the spacer S is outside all the areas problematic for resistance welding. Thus a desired weld result is achieved.

The invention claimed is:

1. A method for welding at least two metal-based materials, non-weldable directly to each other with resistance welding, comprising:
   welding, in a first joining step, at least one spacer to at least one surface of a first metal-based material;
   providing a second metal-based material; and
   resistance welding, in a second joining step, the first material to the second material, wherein, during the resistance welding, the at least one spacer is melted in order to achieve a weld between the first metal-based material and the second metal-based material.

2. The method according to claim 1, wherein the spacer is welded to the first metal-based material by arc welding.

3. The method according to claim 1, wherein the spacer is welded to the first metal-based material by plasma welding.

4. The method according to claim 1, wherein the spacer is welded to the first metal-based material by gas metal arc welding.

5. The method according to claim 1, wherein the spacer is welded to the first metal-based material by beam welding.

6. The method according to claim 1, wherein the spacer is welded to the first metal-based material by laser beam welding.

7. The method according to claim 1, wherein the spacer is welded to the first metal-based material by electron beam welding.

8. The method according to claim 1, wherein the resistance welding is carried out by spot welding.

9. The method according to claim 1, wherein the resistance welding is carried out by roller seam welding.

10. The method according to claim 1, wherein the resistance welding is carried out by projection welding.

11. The method according to claim 1, wherein the resistance welding is carried out by weldbonding.

12. The method according to claim 1, wherein the first metal-based material is a steel comprising more than 0.25 weight % C, more than 3 weight % Mn, more than 0.1 weight % N and more than 3 weight % Mo.

13. The method according to claim 1, wherein a composition of the spacer is calculated in accordance with a Schaeffler diagram.

14. The method according to claim 1, wherein the spacer is welded on the surface of steel having a carbon equivalent (CEV) greater than 0.65%, where the CEV is calculated using a formula CEV=C+Mn/6+(Cu+Ni)/15+(Cr+Mo+V)/5, where C, Mn, Cu, Ni, Cr, Mo, and V are a content of each of these elements in the steel in weight %.

15. The method according to claim 1, wherein the first metal-based material is aluminium.

16. The method according to claim 1, wherein the spacer is made of a filler material.

17. The method according to claim 1, wherein the spacer is made of a braze material.

18. The method according to claim 1, wherein, after resistance welding, a gap defined by the spacer is provided between the first metal-based material and the second metal-based material.

19. The method according to claim 18, wherein a proportion of a diameter of the spacer to a height of the spacer is at least five.

20. The method according to claim 1, wherein crevice conditions are prevented between the materials to be welded by coating the surfaces of the materials and the spacer.

21. The method according to claim 1, wherein a spacer controls and directs the welding heat from the resistance welding.

22. The method according to claim 1, wherein the resistance welding is focused on the first metal-based material and the second metal-based material in an area corresponding to the spacer.

* * * * *